United States Patent [19]
Eckels

[11] 4,223,180
[45] Sep. 16, 1980

[54] HUMAN SPEECH ENVELOPE TRACKER

[75] Inventor: Thomas L. Eckels, Sunnyvale, Calif.

[73] Assignee: The United States of America as represented by the Secretary of the Army, Washington, D.C.

[21] Appl. No.: 972,200

[22] Filed: Dec. 22, 1978

[51] Int. Cl.$^3$ ............................................. G10L 1/00
[52] U.S. Cl. .............................. 179/1 SC; 324/103 P; 307/352
[58] Field of Search ................. 179/1 SC, 1 SA, 1 P, 179/1 VC; 364/487, 486; 307/352; 328/151; 324/103 P

[56] References Cited

U.S. PATENT DOCUMENTS

| | | | |
|---|---|---|---|
| 3,381,091 | 4/1968 | Sondhi | 179/1 SC |
| 3,600,688 | 8/1971 | Booth | 307/352 |
| 3,897,774 | 8/1975 | Burdick et al. | 328/151 |
| 4,086,651 | 4/1978 | Muir et al. | 364/487 |

*Primary Examiner*—Malcolm A. Morrison
*Assistant Examiner*—E. S. Kemeny
*Attorney, Agent, or Firm*—Nathan Edelberg; Sheldon Kanars; Frank J. Dynda

[57] ABSTRACT

This invention recovers the time waveform envelope of a human voice signal without the loss of subtleties providing speaker recognition cues and voice quality.

This is accomplished by rectifying the voice envelope and then obtaining slope information about the original time waveform to detect peaks which are successively held by sample and hold circuitry.

3 Claims, 10 Drawing Figures

HUMAN SPEECH ENVELOPE TRACKER

This invention described herein may be manufactured and used by or for the Government for governmental purposes without the payment of any royalties thereon or therefor.

BACKGROUND OF THE INVENTION

1. Field of the Invention

The present invention relates broadly to the field of natural speech synthesis. The invention specifically involves the use of sample and hold methods derived directly from a continuous analog signal to detect peaks of that signal and to filter them into a smooth time envelope.

2. Description of The Prior Art

Previously this specialized area of speech synthesizers and recorders was performed by simple rectification and filtering of the speech time waveform. The prior art techniques resulted in a necessary compromise between accurate tracking and excessive ripple in the derived envelope waveform, a compromise which this present invention overcomes.

SUMMARY OF THE INVENTION

The "Human Speech Envelope Tracker" is capable of recovering the time signal waveform envelope from a voice signal and also including the parts of the waveform envelope containing speaker recognition cues and voice quality. This invention applies novel sample and hold techniques in conjunction with a continuous analog signal to detect peaks of that signal and to filter them into a smooth time envelope.

DESCRIPTION OF THE PREFERRED EMBODIMENT

Figure 1:
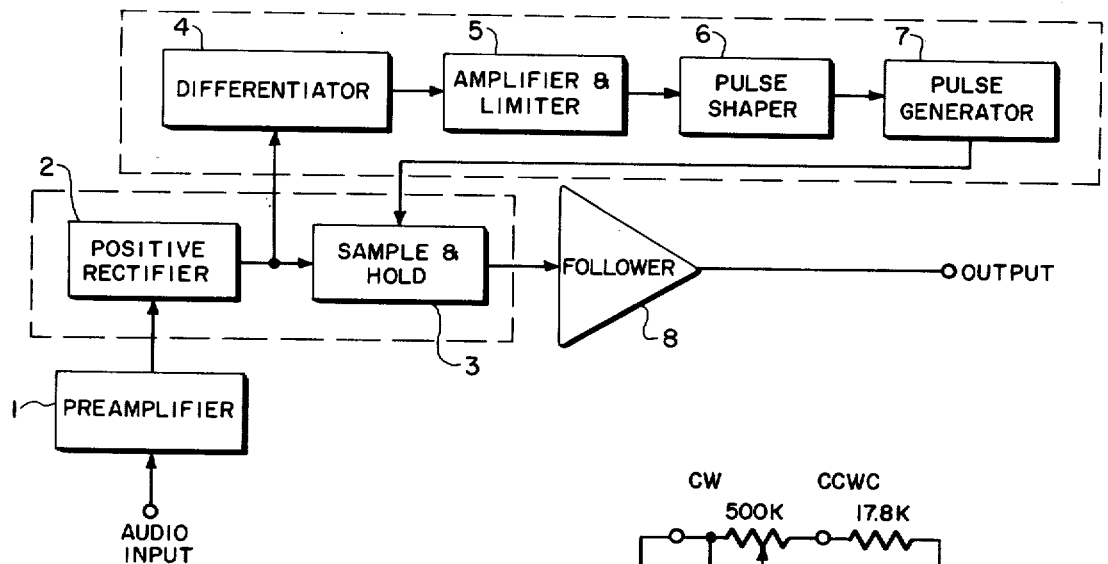
FIG. 1 is a block diagram of the envelope detector.

In describing the preferred embodiments of the subject invention illustrated in the drawings, specific terminology will be resorted to for the sake of clarity. However, it is not intended to be limited to the specific terms so selected, and it is to be understood that each specific term includes all technical equivalents which operate in a similar manner to accomplish a similar purpose.

An adult male speaking English produces a waveform which appears as a complex "carrier," modulated by a pitch signal in the range of 100 Hz. Recovery of the pitch frequency and waveshape is essentially a problem of envelope detection.

Figure 6A:
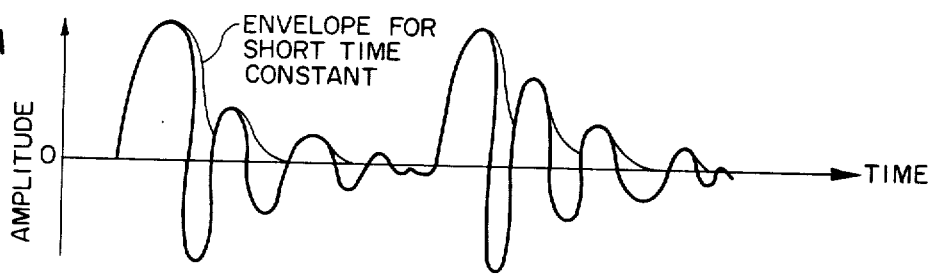
FIGS. 6A and 6B are waveshape drawings of envelope detection schemes.
Figure 6B:
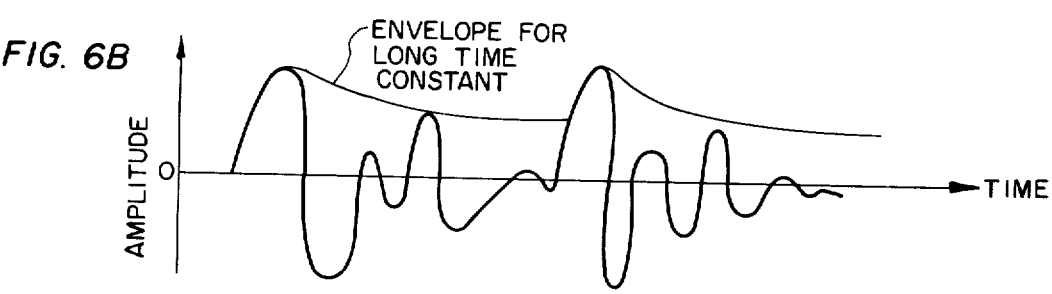

The first step in envelope detection is usually the rectification, either half-wave or full-wave, of the carrier plus modulation. The low-frequency envelope may then be recovered by filtering. The assumption is that a time constant (tc) suitable for following the envelope closely is still long enough to prevent excessive "droop" between times when the envelope is updated by a new pulse of rectified carrier. The assumption is adequate if the carrier is a much higher frequency than the envelope, but in the case of speech "droop" can be as large as the envelope when the speech "carrier" drops to a few hundred Hz. FIG. 6 illustrates the problems associated with normal envelope detection schemes applied to speech. Further difficulty is encountered when it is noted that much of the speaker's quality is carried in subtle variations such as the small dips shown in FIG. 6B. The rectifier-filter envelope detectors mentioned have no difficulty with the leading slope of the speech signals but the trouble arises with the trailing slope. If the tc is short enough to follow closely the "droop" is excessive, and if the tc is long enough to prevent droop it fails to follow the envelope of the trailing slope, as shown in FIG. 6B.

Figure 7:
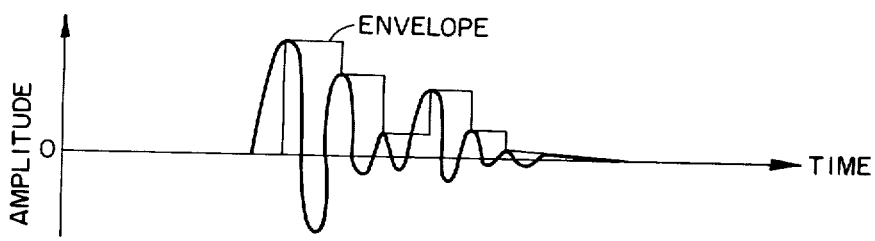
FIG. 7 is a waveshape drawing of the output of the pitch-envelope tracker invention.

The pitch-envelope tracker invention described herein uses an entirely different approach. Since the envelope is constructed from the whole series of peak values, the envelope may be derived by a circuit which holds the last peak value until a new peak arrives and upon the arrival of the new peak switches to and holds the new peak until the next peak arrival. FIG. 7 illustrates the expected output of such a device as applied to speech. The slope of the complex speech is always positive on the leading edge of each peak and becomes negative immediately after the peak has passed. The pitch-envelope tracker differentiates the complex speech wave to obtain this slope information and samples the input signal as soon as the slope becomes negative. The sample is stored until the next peak arrives when it is replaced by the new value.

Figure 8A:
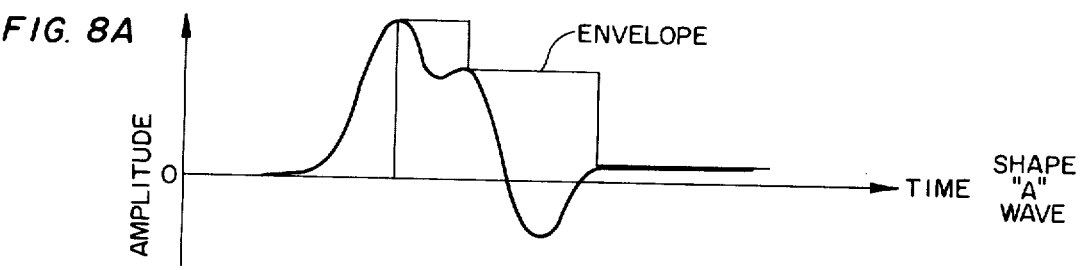
FIGS. 8A and 8B are waveshape drawings of possible envelope tracking errors.
Figure 8B:
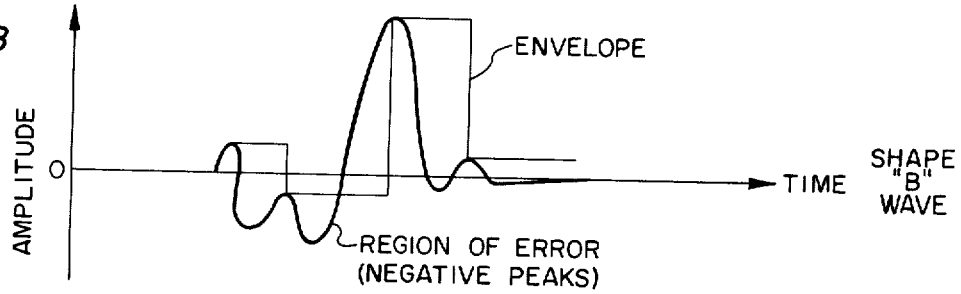

This invention allows correct response (positive envelope) to waves of shape A (FIG. 8A) but in the presence of shape B waves (FIG. 8B), errors would result. To avoid such confusion the differentiator operates from the positive rectified version of the input wave. The gain of the differentiator is such that a very small negative slope is sufficient to cause a new peak to be stored and very little of the peak voltage is lost. A second device could be utilized to reproduce the negative envelope if desired.

Circuit Operation

FIG. 1 represents the pitch envelope tracker block diagram. The audio input is preamplified using the preamplifier 1. The amplified audio output of 1, is then half-wave rectified by the positive rectifier 2. The output of the positive rectifier 2 is coupled to the sample and hold circuit 3, and also to a passive differentiator 4 at the input of an integrated-circuit operational amplifier 5. The amplifier 5 is operated open loop, and the output is limited by a zener diode to values acceptable to an integrated-circuit pulse shaper 6. The shaped pulse triggers a sample strobe whenever the differentiator 4 detects a negative slope on the rectified input to 4. The voltage at the input of the sample and hold circuit 3 when the strobe arrives from the pulse generator 7 is stored until a new sample strobe arrives. An integrated-circuit operational amplifier with low bias current serves as a unit gain follower and output buffer 8 for the sample and hold output.

Figure 2:
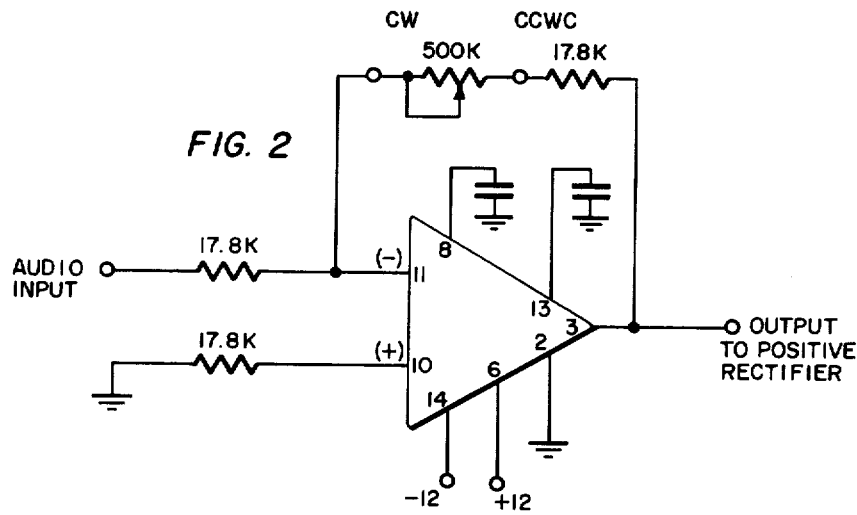
FIG. 2 is a schematic diagram of the preamplifier.

The schematic circuitry utilized for the preamp 1, is shown in FIG. 2.

Figure 3:
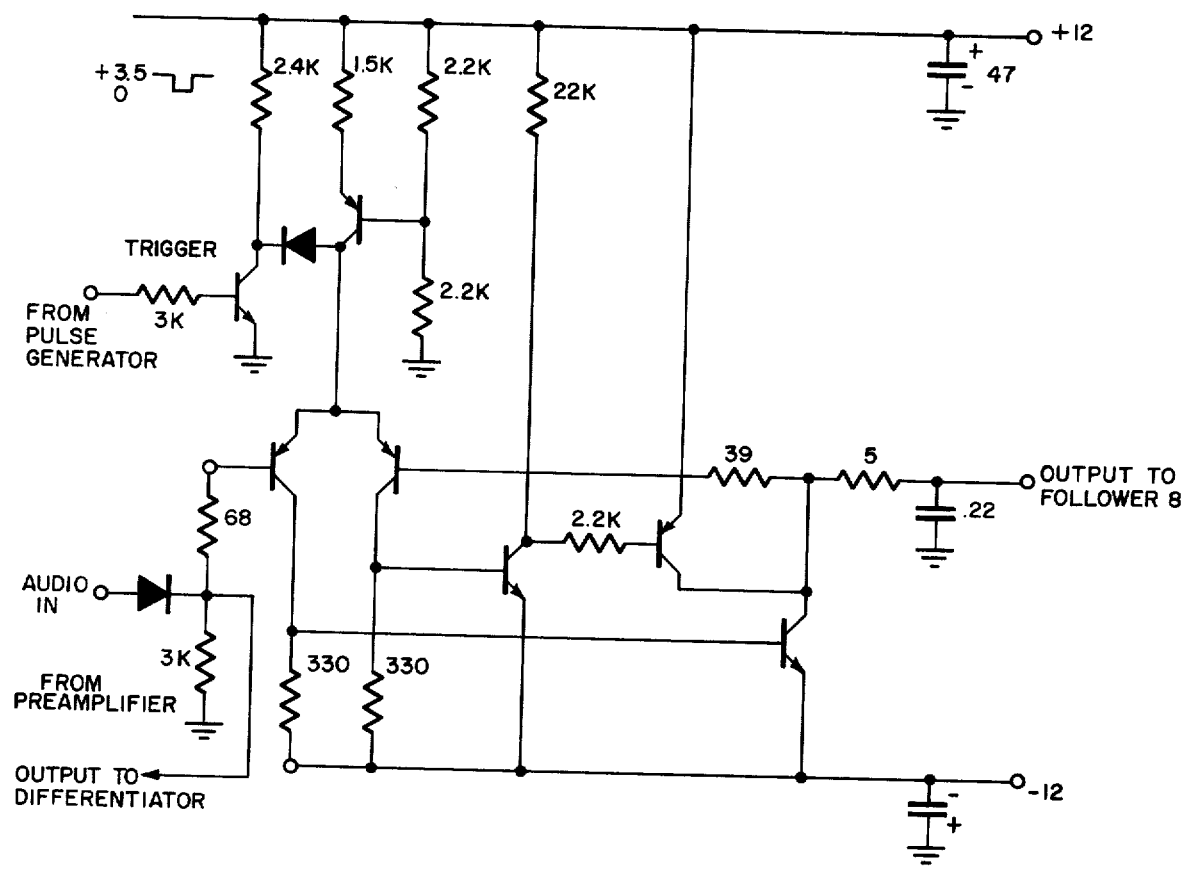
FIG. 3 is a schematic diagram of the positive rectifier and sample and hold circuitry.

The schematic circuitry utilized for the positive rectifier 2 and the sample and hold circuit 3 is shown in FIG. 3.

Figure 4:
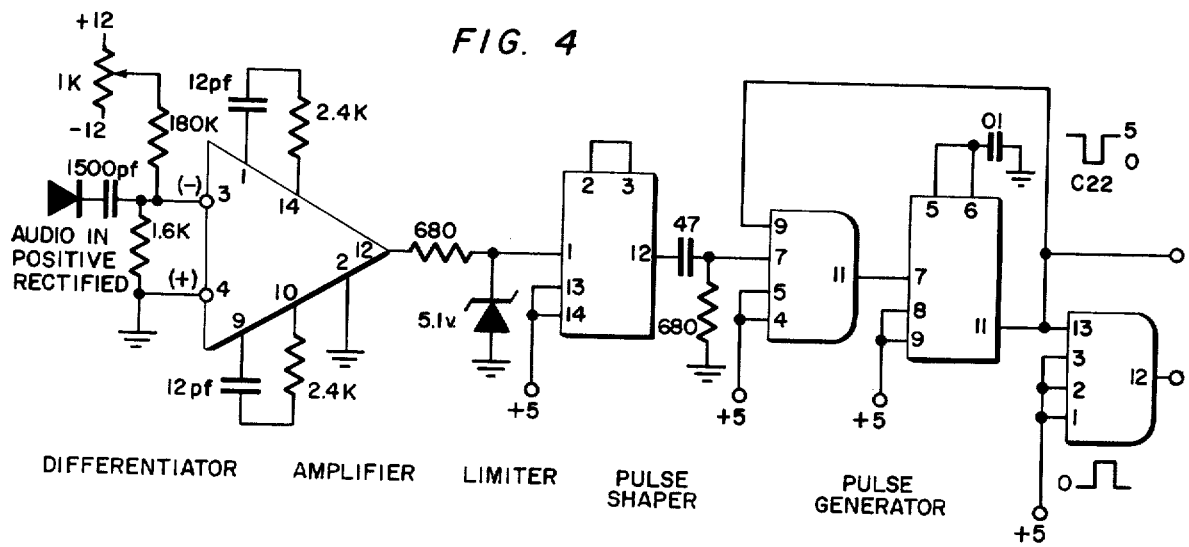
FIG. 4 is a schematic diagram of the envelope tracker differentiator, amplifier-limiter, threshold, and pulse generator circuitry.

The schematic circuitry utilized for the differentiator 4, amplifier-limiter 5, pulse shaper 6, and pulse generator 7 is shown in FIG. 4.

Figure 5:
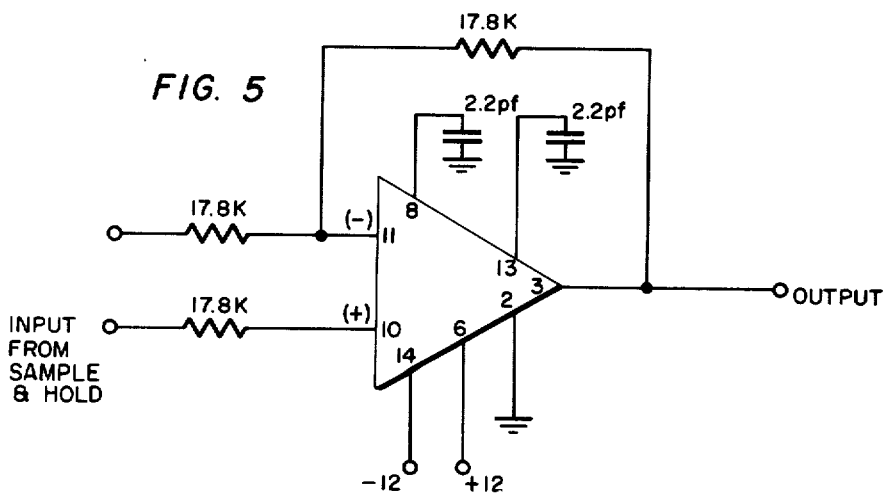
FIG. 5 is a schematic diagram of the envelope tracker follower circuit.

The schematic circuitry utilized for the follower 8, is shown in FIG. 5.

What is claimed is:

1. A method of accurate human speech envelope recovery comprising:
    amplifying an audio signal of said human speech,
    rectifying said amplified audio signal to derive a series of peak values of said audio signal,
    differentiating said rectified audio signal to obtain slope information about each of said peak values, and
    sampling and holding the rectified audio signal for an interval determined by said differentiated signal.

2. The method of claim 1, wherein the differentiating is such that a slight negative slope after any peak of said rectified signal is sufficient to cause that peak to be sampled and stored.

3. A human speech envelope tracker comprising: an audio signal representative of human speech, a preamplifier means having an input and an output for preamplifying said audio signal,
    a rectifier means having an input and an output for rectifying the output of said preamplifier,
    a differentiator means having an input and an output for differentiating the output of said rectifier means,
    an amplifier-limiter means having an input and an output for amplifying and limiting the output of said differentiator means,
    a pulse shaped means having an input and an output for shaping the output of said amplifier-limiter means,
    a pulse generator means having an input and an output for generating a pulse upon receipt of the output of said pulse shaper means,
    a sample and hold means having a first and second input and one output for sampling and holding the output of said rectifier means received at the first input means and outputing said rectifier means output upon receipt of the output of said pulse generator means at said second input, and
    a follower means having an input and an output for receiving the output of said sample and hold means and providing an output.

* * * * *